United States Patent
Brixius et al.

(10) Patent No.: US 6,910,570 B2
(45) Date of Patent: Jun. 28, 2005

(54) TRANSPORT SYSTEM FOR CONTAINERS, IN PARTICULAR AN AIRPORT BAGGAGE HANDLING SYSTEM

(75) Inventors: Wolfgang Brixius, Neunkirchen A.Br (DE); Dominik Gräfer, Dortmund-Wellinghofen (DE); Albrecht Hoene, Lappersdorf (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/841,951

(22) Filed: May 7, 2004

(65) Prior Publication Data

US 2005/0061613 A1 Mar. 24, 2005

(30) Foreign Application Priority Data

May 9, 2003 (DE) .......................... 103 20 961

(51) Int. Cl.[7] .............................. B65G 47/46; B64F 1/32
(52) U.S. Cl. .................... 198/463.3; 198/435; 198/592; 198/369.2; 198/836.1
(58) Field of Search ............................. 198/435, 463.3, 198/592, 370.05, 369.2, 836.1

(56) References Cited

U.S. PATENT DOCUMENTS

| | | | | |
|---|---|---|---|---|
| 3,580,141 A | * | 5/1971 | Richter | 493/27 |
| 4,179,020 A | * | 12/1979 | Heusler et al. | 198/326 |
| 5,372,245 A | * | 12/1994 | Mojden et al. | 198/604 |
| 5,692,593 A | * | 12/1997 | Ueno et al. | 198/369.2 |
| 5,816,383 A | * | 10/1998 | Maier et al. | 198/460.1 |
| 5,909,796 A | * | 6/1999 | Soldavini | 198/369.2 |
| 6,105,751 A | * | 8/2000 | Jentjens et al. | 198/435 |
| 6,220,427 B1 | * | 4/2001 | Ratz et al. | 198/861.2 |
| 6,419,217 B1 | * | 7/2002 | Hartmann et al. | 270/52.12 |
| 6,467,606 B1 | * | 10/2002 | Elent et al. | 198/370.1 |
| 6,499,582 B1 | * | 12/2002 | Gillott | 198/360 |
| 6,557,724 B1 | * | 5/2003 | LeCroy et al. | 221/76 |
| 6,619,464 B2 | * | 9/2003 | Peppel et al. | 198/369.2 |
| 2002/0104736 A1 | | 8/2002 | Peppel et al. | |

FOREIGN PATENT DOCUMENTS

| | | |
|---|---|---|
| DE | 2 008 802 | 9/1971 |
| DE | 693 02 193 T2 | 9/1996 |
| FR | 1 173 629 A | 2/1959 |
| GB | 2 224 147 A | 4/1990 |

\* cited by examiner

Primary Examiner—Douglas Hess
(74) Attorney, Agent, or Firm—Henry M. Feiereisen

(57) ABSTRACT

A container transport system includes a first conveyor assembly at one transport plane, and a second conveyor assembly at another transport plane, and a transfer device for moving the containers between the conveyor assemblies. Each of the conveyor assemblies has a split conveyor to define a gap, and a further conveyor movable between a first position bridging the gap and a second position in which the further conveyor is moved outwardly transversely to the transport direction. The transfer device includes a convex portion disposed in proximity of one transport plane and a concave portion which can swing into the other transport plane. The container has a bottom underside formed in transport direction with at least one grooved recess which defines a leading edge and a trailing edge, as viewed in transport direction, with the convex and concave portions engaging only the leading and trailing edges of the container, as the container is moved between the transport planes.

16 Claims, 5 Drawing Sheets

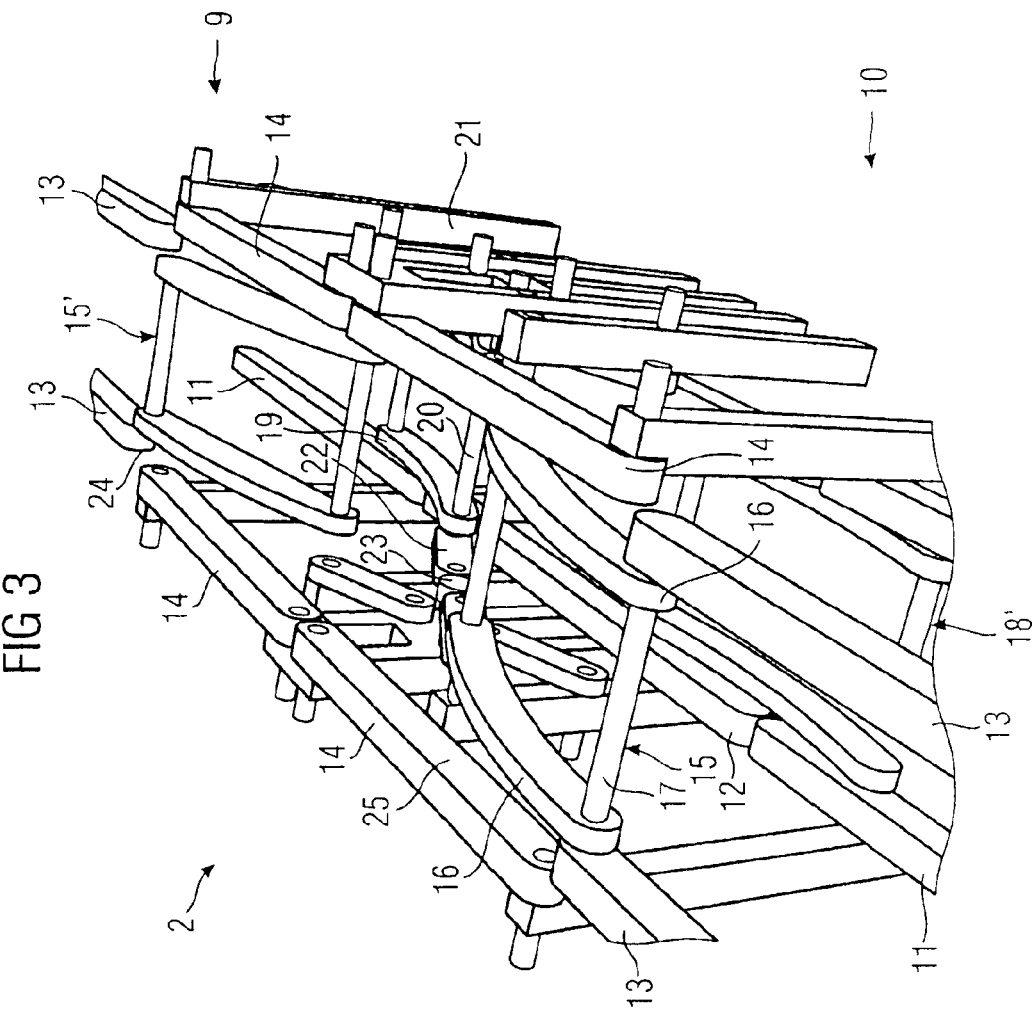

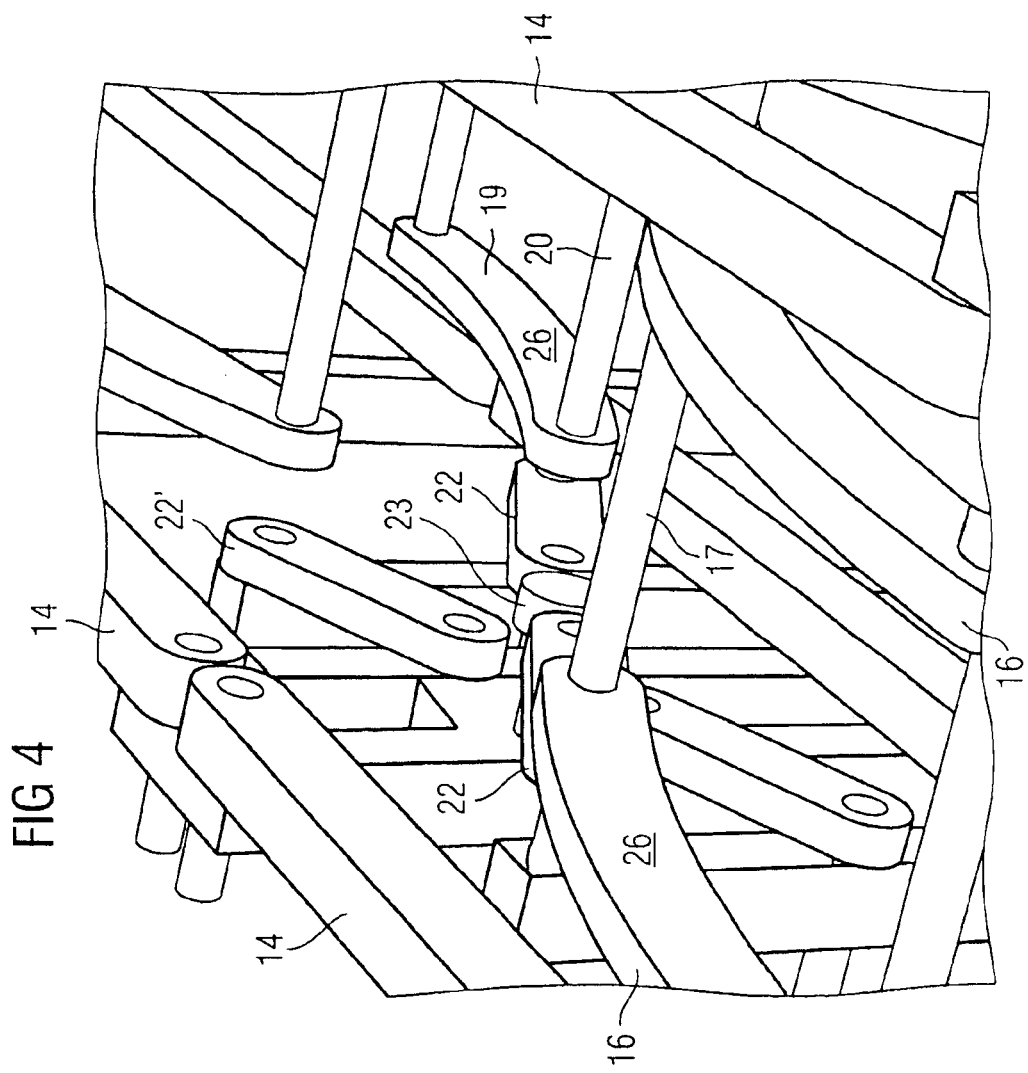

US 6,910,570 B2

TRANSPORT SYSTEM FOR CONTAINERS, IN PARTICULAR AN AIRPORT BAGGAGE HANDLING SYSTEM

CROSS-REFERENCES TO RELATED APPLICATIONS

This application claims the priority of German Patent Application, Serial No. 103 20 961.1, filed May 9, 2003, pursuant to 35 U.S.C. 119(a)–(d), the disclosure of which is incorporated herein by reference.

BACKGROUND OF THE INVENTION

The present invention relates, in general, to a transport system for containers, in particular an airport baggage handling system, and more particularly to a transfer device of such a transport system to move a container between various elevations.

Transfer devices or crossover switches for transport systems, in particular airport baggage handling systems, are used to move containers that carry bags along transport paths including between vertically spaced-apart transport paths. The transfer devices have hereby a vertical ascent which moves the containers between the vertically spaced-apart transport paths and is implemented by a series of straight conveyor elements so lined up to resemble a convex and concave transport path, as viewed from the upper transport path to the lower transport path. During transfer, the straight conveyor elements are tilted from a horizontal disposition into an angular position until the container has reached the other transport plane. This approach results in high wear of the containers and operates very noisy.

As an alternative, it has been proposed to return the conveyor elements from the angular position to the horizontal while the container is still on the conveyor element. This proposal results, however, in the arrangement of relatively long conveyor elements in correspondence to the conveyance speed so that the throughput rate is reduced. In addition, there is a need for many switching circuits when two successive containers are transported in the same direction.

It would therefore be desirable and advantageous to provide an improved transport system and improved transfer device to obviate prior art containers and little noise generation while still being reliable in operation.

SUMMARY OF THE INVENTION

According to one aspect of the present invention, a transport system for containers, in particular an airport baggage handling system, includes a first conveyor assembly extending at a first transport plane for transport of a container in a transport direction, a second conveyor assembly extending at a second transport plane at a vertical distance to the first transport plane for transport of a container in the transport direction, each of the first and second conveyor assemblies having a split conveyor to define a gap, and a further conveyor movable between a first position in which the further conveyor bridges the gap and a second position in which the further conveyor is moved outwardly transversely to the transport direction, and a transfer device for moving the container between the first and second conveyor assemblies, when the further conveyor of one of the first and second conveyor assemblies is moved to the second position, wherein the transfer device includes a convex portion disposed in proximity of one of the first and second transport planes and a concave portion constructed to swing into the other one of the transport planes, with the convex and concave portions arranged in succession of the transport direction, wherein the container has a bottom underside formed in transport direction with at least one grooved recess which defines a leading edge and a trailing edge, as viewed in transport direction, with the convex and concave portions of the transfer device engaging only the leading and trailing edges of the container, as the container is moved between the first and second transport planes.

The present invention resolves prior art problems by providing a transport system by which only the edges of the recess of the containers are supported by the transfer device while the containers assume a stable disposition during their movement between the transport planes. The advance of the containers is hereby substantially smooth and jerk-free.

According to another feature of the present invention, the transfer device may be comprised of at least one concavely curved conveyor and at least one convexly curved conveyor. In this way, an even transport of the containers is realized. The even transport may further be enhanced by providing the transfer device with a conveyor unit to provide a straight conveyor to bridge a spacing between the concavely curved conveyor and the convexly curved conveyor. To avoid interference of the container transport along the lower plane, the conveyor unit may be constructed for movement out of the passage zone of the container. Suitably, the conveyor unit includes a pair of aligned spaced-apart conveyor arms and a driving wheel disposed between the conveyor arm.

According to another feature of the present invention, the conveyors of the first and second conveyor assemblies and the conveyors of the transfer device may all be constructed in the form of a driven conveyor belt. Suitably, the conveyor belt of the concavely curved conveyor is guided about a guide element of a configuration to conform to a concave course of the concavely curved conveyor, and the conveyor belt of the convexly curved conveyor is guided about a guide element of a configuration to conform to a convex course of the convexly curved conveyor. In order to enhance the even passage of the containers, the guide elements may be constructed to interact with both sidewalls of the recess for guiding the container. The guide elements may be constructed in the form of a plate defined by a thickness to correspond to a distance between the sidewalls.

According to another feature of the present invention, the container may be formed with two such recesses for engagement by the transfer device, with each recess being rectangular in cross section and having longitudinal sides in parallel relationship.

According to another aspect of the present invention, a transfer device of a transport system, in particular airport baggage handling system, for moving a container between two vertically spaced-apart transport planes, includes a convex portion disposed in proximity of one of the transport planes and a concave portion constructed to swing into the other one of the transport planes, said convex and concave portions arranged in succession of a container transport direction and sized to engage only leading and trailing end edges of a recess in a bottom underside of the container, as the container is moved between the first and second transport planes by the concave and convex portions.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a cutaway perspective view, on an enlarged scale, of the transfer device in the operative position;

FIG. 4 is a cutaway perspective view, on a further enlarged scale, of the transfer device in the operative position according to FIG. 3.

DETAILED DESCRIPTION OF PREFERRED EMBODIMENTS

Figure 1:
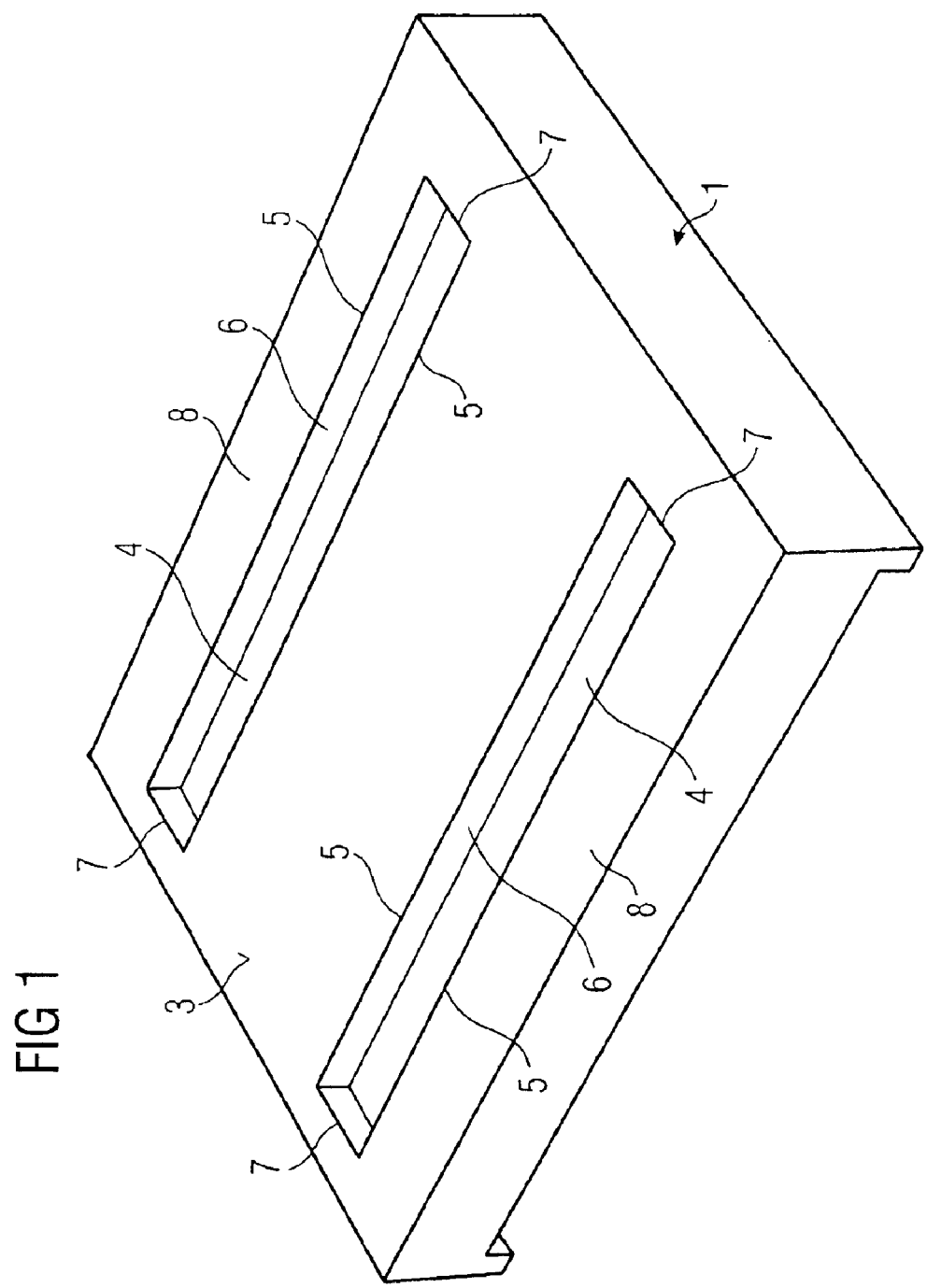
FIG. 1 is a bottom perspective view of a container for use in a transport system according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a bottom perspective view of a container, generally designated by reference numeral 1, for use in a transport system according to the present invention. The container 1 has a flat bottom underside 3 having formed therein two groove-shaped recesses 4 which are rectangular in cross section. The recesses 4 have longitudinal sides 5 in parallel relationship and are each bounded by parallel sidewalls 6. As viewed in transport direction of the container 1, the recesses 4 define leading and trailing end edges 7 which together with lateral support surfaces 8 are used for transport of the container 1.

Figure 2:
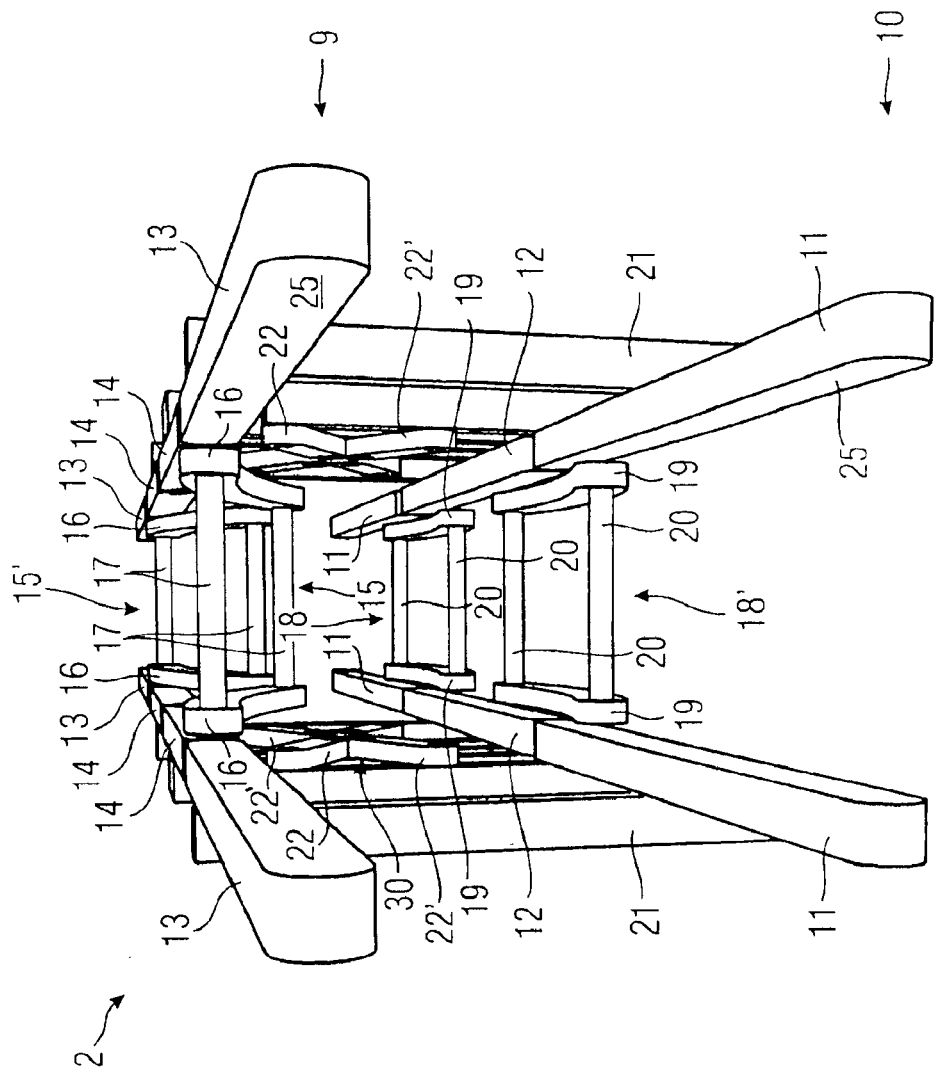
FIG. 2 is a perspective view of a transfer device according to the present invention for movement of the container, depicting the transfer device in an idle position.

Referring now to FIG. 2, there is shown a perspective view of a transfer device according to the present invention, generally designated by reference numeral 2, for movement of containers 1 between an upper transport plane 9 and a lower transport plane 10. The transfer device 2 is depicted here in an idle position. In other words, a transfer of containers 1 between the transport planes 9, 10 does not take place. The upper transport plane 9 is comprised of a pair of parallel split straight conveyors 13 with respective gaps 24 (FIG. 3) therebetween, and a pair of parallel straight conveyors 14 which are constructed to bridge the gaps 24. Likewise, lower transport plane 10 is comprised of a pair of parallel split straight conveyors 11 with respective gaps therebetween, and a pair of straight conveyor 12 which bridge the gaps. During their transport, the containers 1 are supported on the transport planes 9, 10 with their support surfaces 8.

It will be appreciated by persons skilled in the art, that the conveyors 11, 12, 13, 14 are shown in the drawing schematically only and must contain much mechanical apparatus which does not appear in the drawing for the sake of simplicity. For example, each of the conveyors, 11, 12, 13, 14 a continuous belt as driving element which is wrapped about belt-reversing pulleys and move along guide elements shown schematically only by reference numeral 25.

The straight conveyors 14 together with their driving belts are movable to the outside sufficient to clear the space for operation of the transfer device 2 and allowing the containers 1 to dive down toward the transport plane 10. The transfer device 2 includes hereby a convexly curved conveyor 15 in the upper transport plane 9 and a concavely curved conveyor 18 in the lower transport plane, when transporting the containers 1, for example, into the drawing plane of FIG. 2. For transport of container 1 out of the drawing plane, the transfer device 2 includes a further convexly curved conveyor 15' in the upper transport plane 9 and a further concavely curved conveyor 18'. Thus, as best shown in FIG. 3, the straight conveyors 14 are moved outwards sufficient to enable the convexly curved conveyor 15, 15' to receive the container 1, without interference by the conveyors 14.

For convenience and sake of simplicity, much of the following description is made only in relation to a container transport from the drawing plane out, i.e. in relation to FIG. 3, from the top left-hand side to the bottom right-hand side, when in fact the container transport may also take place in the opposite transport direction, i.e. again in relation to FIG. 3, from the bottom right-hand side to the top left-hand side. Thus, although the transfer device 2 will be described with respect to only the transport direction into the drawing plane, it will be understood that the components of the transfer device 2 for transport in the opposite transport direction operate in a same fashion. In other words, conveyors 12, for example, of the lower transport plane 10 are also movable to the outwards.

The convexly curved conveyor 15 includes two side elements 16 in parallel spaced-apart relationship which are interconnected by rods 17 and are also constructed as continuous belts as driving elements looped about guide elements 26 (FIG. 4) and belt-reversing pulleys. Likewise, the concavely curved conveyor 18 in the lower transport plane 10 includes side elements 19 in parallel spaced-apart relationship which are interconnected by rods 20 and are also constructed as continuous belts as driving elements looped about guide elements 26 and belt-reversing pulleys. In order to prevent interference by the conveyor 18 during passage of containers along the conveyors 11, the conveyor 18 can swing downwards away from the transport plane 10.

It will be appreciated by persons skilled in the art that the guide elements 26 are shown here only schematically and may be constructed in any suitable manner, e.g. single block or plurality of rollers or drums, to conform to a concave course of the concavely curved conveyor 18 and to conform to a convex course of the convexly curved conveyor 16.

The transfer device 2 is mounted in a framework comprised of uprights 21. Secured to the inside of the framework on both sides of the transport planes 9, 10 are conveyor units 30 for linear support of the containers 1 as they are moved between the conveyors 15, 18. Each conveyor unit 30 has one pair of conveyor arms 22 in opposite relationship for defining a linear transport path for the containers 1 in one transport direction and another pair of conveyor arms 22' in opposite relationship for defining a linear transport path for the containers 1 in opposite transport direction. The conveyor arms 22, 22' of each conveyor unit 30 extend outwardly from a central driving element 23 and are realized in the form of short, straight conveyor belts. Depending on the transport direction, the two pairs of conveyor arms 22, 22' can selectively moved inwards from an outer idle position, shown in FIG. 2, into an inner operative position, shown in FIGS. 3 and 4, in which the conveyor arms 22 are located in the container transport path between the transport planes 9, 10, while the conveyor arms 22' occupy the idle position.

Turning now to FIG. 3, there is shown a cutaway top perspective view, on an enlarged scale, of the transfer device 2 in the operative position in which the transport planes 9, 10 are connected by the transfer device 2 to move the containers 1 therebetween. Again, the following description refers to a transport direction from top left to bottom right, into the drawing plane. The conveyors 14 are moved to the outside to enable the transfer device 2 to assume the further movement of the container 1 from the transport plane 9 to the transport plane 10. Thus, the transport of the container 1 takes place via the conveyor 15, conveyor unit 30 and conveyor 18, whereby the conveyor 18 is hereby pivoted upwards into the space between the transport planes 9, 10. In addition, the conveyor arms 22 of the conveyor units 30 on both sides of the framework are moved inwards (see also FIG. 4) so that the side surfaces 8 of the container 1, after the container 1 has passed the conveyor 15, are supported by the conveyor arms 22.

Figure 3A:
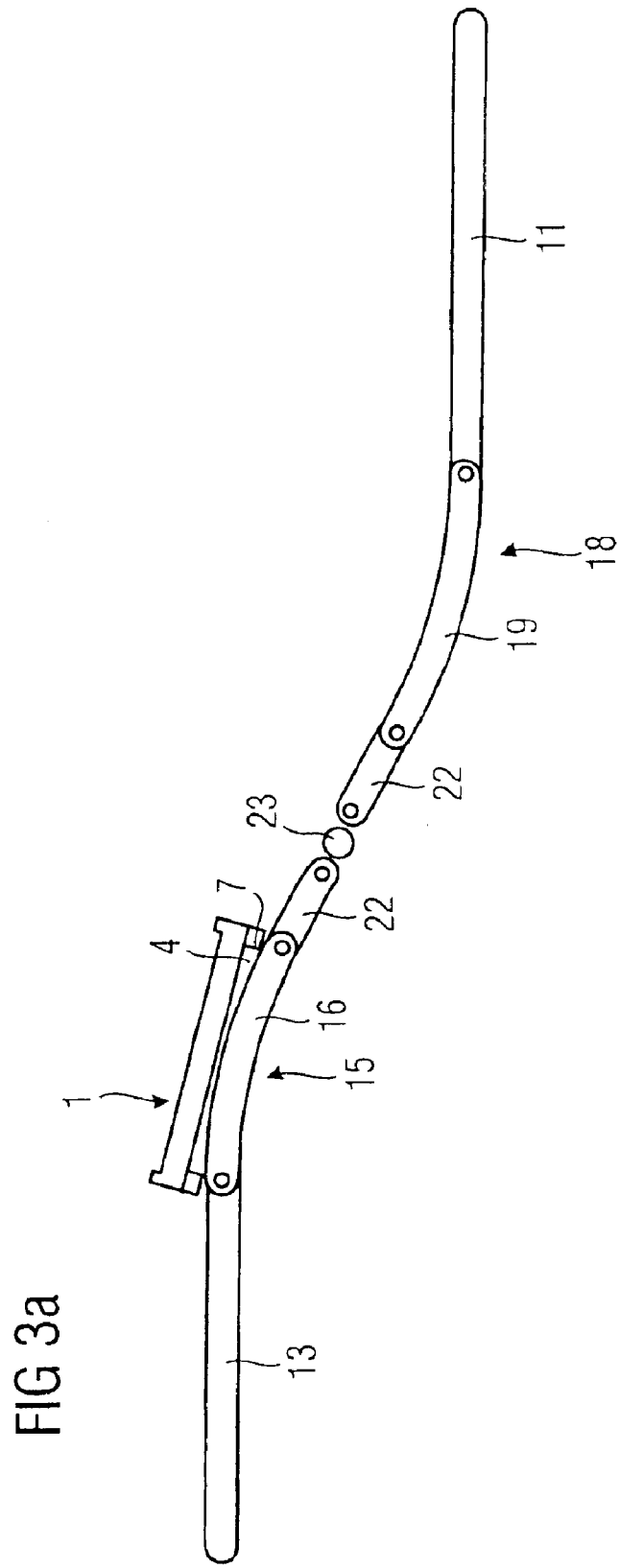
FIG. 3a is side elevation of the transfer device for moving the container from an upper transport plane to a lower transport plane.

As shown in particular in FIG. 3a, during passage of the convexly curved conveyor 15, the container 1 is supported by the driven belt of the side elements 16 only upon the end edges 7 of the recesses 4, as the side elements 16 project into the recesses 4 without touching the bottom of the recesses 4. Likewise, when the container 1 is then transferred to the concavely curved conveyor 18, the container 1 is supported by the driven belt of the side elements 19 only upon the end edges 7 of the recesses 4, as the side elements 19 project into the recesses 4 without touching the bottom of the recesses 4.

During transport of the containers 1, the side elements 16 of the convexly curved conveyor 15 and the side elements 19 of the convexly curved conveyor 18 engage the recesses 4 and interact with the sidewalls 6 of the recesses 4 for lateral guidance of the container 1. The side elements 16, 19 have a plate-shaped configuration with a thickness that corresponds to the distance between the sidewalls 6.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A transport system for containers, in particular an airport baggage handling system, comprising:
    a first conveyor assembly extending at a first transport plane for transport of
    a container in a transport direction;
    a second conveyor assembly extending at a second transport plane at a vertical distance to the first transport plane for transport of a container in the transport direction, each of the first and second conveyor assemblies having a split conveyor to define a gap, and a further conveyor movable between a first position in which the further conveyor bridges the gap and a second position in which the further conveyor is moved outwardly transversely to the transport direction; and
    a transfer device for moving the container between the first and second conveyor assemblies, when the further conveyor of one of the first and second conveyor assemblies is moved to the second position, wherein the transfer device includes a convex portion disposed in proximity of one of the first and second transport planes and a concave portion constructed to swing into the other one of the transport planes, said convex and concave portions arranged in succession of the transport direction,
    wherein the container has a bottom underside formed in transport direction with at least one grooved recess which defines a leading edge and a trailing edge, as viewed in the transport direction, with the convex and concave portions of the transfer device capable of engaging only the leading and trailing edges of the container, as the container is moved between the first and second transport planes.

2. The transport system of claim 1, wherein the split conveyor includes a pair of spaced-apart driving conveyor belts, and the further conveyor includes a pair of spaced-apart driving conveyor belts.

3. The transport system of claim 1, wherein the transfer device is comprised of at least one concavely curved conveyor and at least one convexly curved conveyor.

4. The transport system of claim 3, wherein the transfer device includes a conveyor unit to provide a straight conveyor path to bridge a spacing between the concavely curved conveyor and the convexly curved conveyor for transport of the container.

5. The transport system of claim 4, wherein the conveyor unit is constructed for movement between an idle disposition, in which the conveyor unit is moved to the outside away from a transport path of the container, and an operative position in which the conveyor unit is positioned to form the straight conveyor path.

6. The transport system of claim 3, wherein the conveyor unit includes a pair of aligned spaced-apart conveyor arms and a driving wheel disposed between the conveyor arms.

7. The transport system of claim 6, wherein the conveyors of the transfer device and the conveyor arms of the conveyor unit are each constructed in the form of a driving conveyor belt.

8. The transport system of claim 7, wherein the conveyor belt of the concavely curved conveyor is guided about a guide element of a configuration to conform to a concave course of the concavely curved conveyor, and the conveyor belt of the convexly curved conveyor is guided about a guide element of a configuration to conform to a convex course of the convexly curved conveyor.

9. The transport system of claim 8, wherein the guide element of the convexly curved conveyor and the guide element of the concavely curved are constructed to interact with both sidewalls of the recess for guiding the container.

10. The transport system of claim 9, wherein each of the guide elements are constructed in the form of a plate defined by a thickness to correspond to a distance between the sidewalls.

11. The transport system of claim 1, wherein the container is formed with two of said recess for engagement by the transfer device, each said recess being rectangular in cross section and having longitudinal sides in parallel relationship.

12. A transfer device of a transport system, in particular airport baggage handling system, for moving a container between two vertically spaced-apart transport planes, comprising a convex portion disposed in proximity of one of the transport planes and a concave portion constructed to swing into the other one of the transport planes, said convex and concave portions arranged in succession of a container transport direction and sized to engage only leading and trailing end edges of a recess in a bottom underside of the container, as the container is moved between the first and second transport planes by the concave and convex portions.

13. The transfer device of claim 12, wherein the concave portion is a concavely curved conveyor and the convex portion is a convexly curved conveyor.

14. The transfer device of claim 13, and further comprising a conveyor unit to provide a straight conveyor to bridge a spacing between the concavely curved conveyor and the convexly curved conveyor for transport of the container.

15. The transfer device of claim 14, wherein the conveyor unit is constructed for movement out of a passage zone of the container.

16. The transfer device of claim 14, wherein the conveyor unit includes a pair of aligned spaced-apart conveyor arms and a driving wheel disposed between the conveyor arms.

* * * * *